United States Patent Office 2,883,342
Patented Apr. 21, 1959

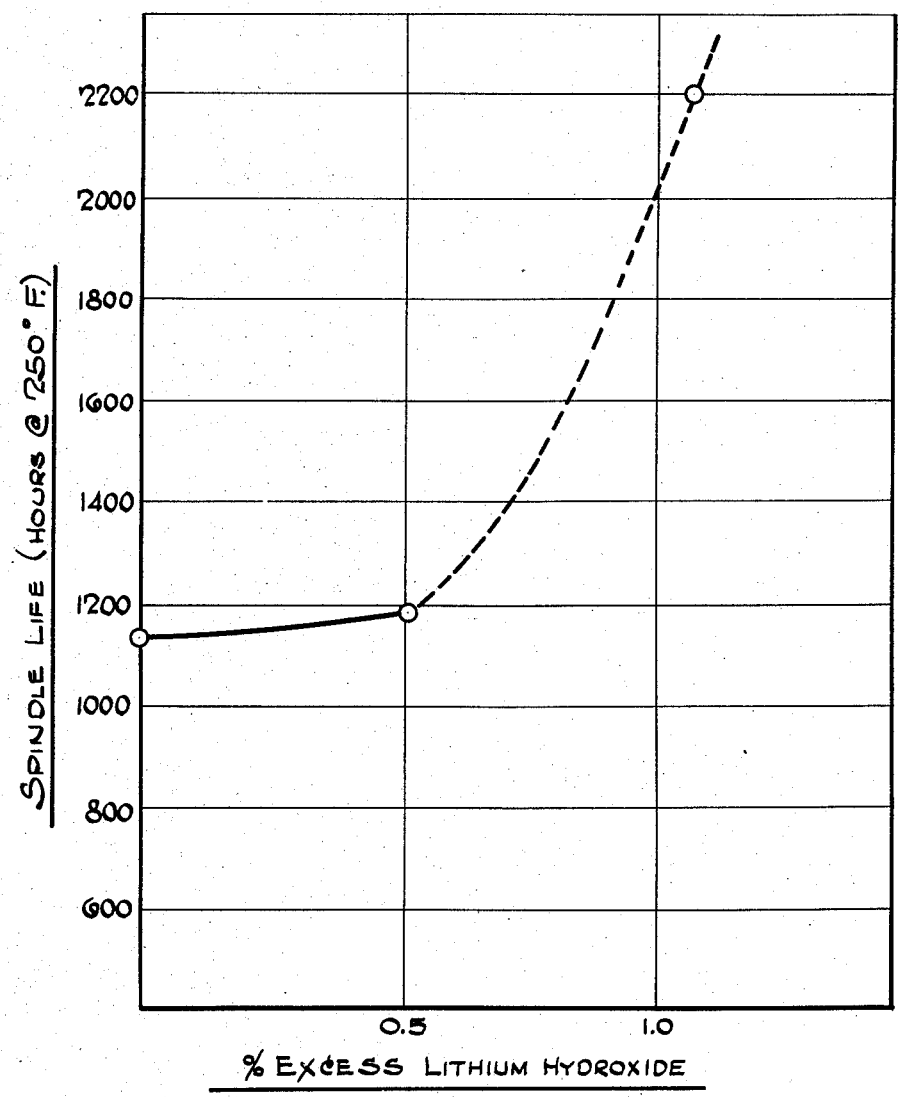

2,883,342

LITHIUM GREASES CONTAINING EXCESS LITHIUM HYDROXIDE

Lorne W. Sproule, Sarnia, Ontario, Laurence F. King, Mooretown, Ontario, and Warren C. Pattenden, Courtright, Ontario, Canada, assignors to Esso Research and Engineering Company, a corporation of Delaware Application March 22, 1956, Serial No. 573,123

2 Claims. (Cl. 252—42.1)

The present invention relates to improved greases and methods for their preparation. More particularly, the invention pertains to improved lithium greases and their manufacture.

This application is a continuation-in-part of Serial No. 315,056, filed October 16, 1952, and now abandoned, having the same inventorship.

In its broadest aspect, the invention is concerned with lubricating greases containing as a grease thickener the lithium soap of hydroxy stearic acid, and a small proportion of excess lithium hydroxide. Greases of this type are superior to similar greases free of excess lithium hydroxide, with respect to their stability at high temperatures and high speeds of the frictional surfaces lubricated.

Lithium greases have been known and widely used for several years. The lithium soaps used as the thickener for these greases is usually prepared by reacting lithium hydroxide or other suitable lithium bases in substantially stoichiometric proportions with conventional high molecular weight acids. These lithium soaps may be incorporated in suitable mineral or synthetic lubricating oils in proportions varying between about 1 and 20 wt. percent, depending on the consistency of the grease desired.

Lithium greases of this type have the unique characteristic of combining high dropping point with high water resistance and ease of dispersion in all types of lubricating oil. These properties have made lithium greases particularly valuable for many aeronautical and military applications. However, the utility of these greases is somewhat curtailed by their relatively short lubricating life, particularly at high temperatures and high frictional speeds. Conventional anti-oxidants, such as, for example, phenyl-alpha-naphthylamine, are not very effective in prolonging the lubricating life of these greases.

The present invention overcomes this drawback and affords various additional advantages as will appear more clearly from the subsequent description of the invention and the practical examples given, wherein reference will be made to the accompanying drawing the single figure of which is a graphical illustration of beneficial effects afforded by the invention.

It has now been found that the lubricating life of lithium hydroxy stearate thickened greases may be substantially extended by incorporating into the grease an appreciable free alkalinity in the form of excess lithium hydroxide over that required to neutralize the fatty acid. The excess of lithium hydroxide should amount to at least about 1.0 wt. percent and may be as much as 2 wt. percent or more, based on the finished grease. However, concentrations above about 1.5 wt. percent are only slightly more effective than lower concentrations within this range. The preferred range of excess lithium hydroxide is, therefore, about 1.0 to 1.5 wt. percent. It is essential for the purposes of the invention that the free alkalinity of the finished grease results predominantly from the presence of excess lithium hydroxide as distinguished from other basic lithium compounds, such as the carbonate which has been found to be rather ineffective.

The hydroxy stearic acid contemplated in this invention is 12-hydroxy stearic acid, and usually about 5 to 30, preferably about 8 to 20, wt. percent, based on the total grease, of the lithium soap of 12-hydroxy stearic acid may be employed in preparing the lubricating grease compositions of the invention. In general, any of the conventional lubricating oils such as mineral, animal, vegetable and synthetic lubricating oils, may be employed as the grease base. These lubricating oils will have a viscosity of about 35 to 200 SSU at 210° F. Mixtures of lubricating oils may also be effectively utilized. The grease compositions of the invention will usually contain about 70 to 95, preferably about 80 to 92, wt. percent, based on the total grease, of the lubricating oil base.

Greases in accordance with the invention may be prepared as follows. The hydroxy stearic acid may be dissolved in lubricating oil while heating to about 125°–175° F. at atmospheric pressure. Lithium hydroxide is added to this solution in amount sufficient for complete neutralization of the hydroxy stearic acid and to provide the desired excess of lithium hydroxide in the finished grease. The mixture may then be dehydrated by heating to about 280°–320° F. at atmospheric pressure. Thereafter the grease may be diluted with additional lubricating oil and melted at temperatures usually above 400° F. at atmospheric pressure. The grease may then be cooled with mixing and, if desired, homogenized. If lithium hydroxy stearate greases are melted and allowed to cool at rest, a large proportion of the oil component separates. It may be desirable, therefore, to stir the molten grease into a grease mixer and pass the cold grease through a grease mill.

The invention will be further illustrated by the following specific example which is not intended to be limiting in scope.

A number of greases were prepared as hereinafter described, and tested for their lubrication life by the standard spindle life test #33.1 of Federal Specification V.V.L. 791D at 250° F. and a bearing rotating speed of 10,000 r.p.m. Excess lithium hydroxide was determined by titrating the grease dispersed in 50 parts petroleum ether and 50 parts ethyl alcohol at room temperature. Total alkali which includes lithium hydroxide and lithium carbonate was determined by adding 10 ml. of standard hydrochloric acid, refluxing and back-titrating.

EXAMPLE

*Grease A.*—This grease was prepared by reacting the hydroxy stearic acid dissolved at 150° F. in an equal weight of the mineral lubricating oil, having a viscosity of 60 SSU at 210° F. and a viscosity index of 50, with an aqueous solution of lithium hydroxide. After dehydrating the mixture at 300° F., the balance of the oil was added and the grease was melted at 410° F. The molten grease was then stirred down in a grease mixer, the phenyl alpha-naphthylamine added and, when cold, passed through a grease mill. The final grease composition did not contain any free lithium hydroxide, but it did contain 0.04% lithium carbonate as excess alkali.

*Grease B.*—This grease was prepared in the manner described in the preparation of grease A, with the exception that sufficient aqueous lithium hydroxide was added to completely neutralize the hydroxy stearic acid and to provide an excess of about 0.52% free lithium hydroxide.

*Grease C.*—This grease was also prepared in the manner described in the preparation of grease A, with the exception that sufficient aqueous lithium hydroxide was added to provide an excess of about 1.08% free lithium hydroxide and 0.02% lithium carbonate.

*Grease D.*—This grease was prepared by reacting the stearic acid dissolved at 150° F. in an equal weight of a mineral lubricating oil having a viscosity of 66 SSU at 210° F. and a viscosity index of 90, with an aqueous solution of lithium hydroxide. Sufficient aqueous lithium hydroxide was used to completely neutralize the stearic acid and to provide an excess of about 1.08% free lithium hydroxide. After dehydrating the mixture at 300° F., the balance of the oil was added, and the resulting grease melted at 410° F. The molten grease was then cast into pans, allowed to cool to room temperature and then homogenized in a grease mixer. About 1 wt. percent of phenyl alpha-naphthylamine was added prior to casting the grease.

The formulations and inspections of greases A to D are tabulated below:

Table I

| Grease Designation | A | B | C | D |
|---|---|---|---|---|
| Formula, percent by weight: | | | | |
| Stearic Acid | | | | 12.0 |
| 12 Hydroxy-Stearic Acid | 9.5 | 9.5 | 9.5 | |
| Lithium Hydroxide Monohydrate | 1.4 | 1.9 | 2.4 | 3.0 |
| Mineral Oil— | | | | |
| (Visc. @ 210° F., 60 V.I. 50) | 88.1 | 87.6 | 87.1 | |
| (Visc. @ 210° F., 66 V.I. 90) | | | | 84.0 |
| Phenyl - alpha - naphthylamine | 1.0 | 1.0 | 1.0 | 1.0 |
| Inspections: | | | | |
| Percent Excess Lithium Hydroxide | Nil | 0.52 | 1.08 | 1.08 |
| Percent Total Excess Alkali | 0.04 | 0.60 | 1.10 | 1.10 |
| Worked Penetration | 244 | | 300 | 270 |
| Spindle Life @ 250° F.—hrs | 1,133 | 1,174 | 2,200 | 909 |

The effect of varying concentration of free lithium hydroxide on the spindle life of lithium hydroxy-stearate grease is graphically illustrated in the drawing. It will be noted that the upward slope of the spindle life curve increases rapidly at a free lithium hydroxide concentration above about 1.0%.

The above data show that lithium 12-hydroxy stearate thickened greases having a free lithium hydroxide content of at least about 1.0 wt. percent have a considerably higher lubricating life (grease C, 2200 hours) than similar greases having no excess lithium hydroxide (grease A, 1133 hours) or a free lithium hydroxide content of less than 1.0% (grease B, 1174 hours). In addition, the data further show that the lubricating life of grease C, the inventive grease composition, was also considerably higher than the lubricating life of a lithium stearate thickened grease containing the same amount of free lithium hydroxide (grease D).

It is to be understood that conventional additives may be used in the grease composition of this invention. These additive materials, such as tackiness agents, viscosity index improvers, anti-corrosion agents, oxidation inhibitors, extreme pressure agents, etc., may be incorporated by methods familiar to the art.

What is claimed is:
1. A lubricating grease composition comprising a major proportion of a mineral lubricating oil, a minor grease-making proportion of a lithium soap of hydroxy stearic acid and in the range of 1.0 to 2.0 wt. percent free lithium hydroxide.
2. The lubricating grease composition of claim 1 wherein said hydroxy stearic acid is 12-hydroxy stearic acid.

References Cited in the file of this patent
UNITED STATES PATENTS

| | | |
|---|---|---|
| 2,397,956 | Fraser | Apr. 9, 1946 |
| 2,585,321 | Butcosk | Feb. 12, 1952 |
| 2,684,944 | Zajac | July 27, 1954 |